Patented June 27, 1944

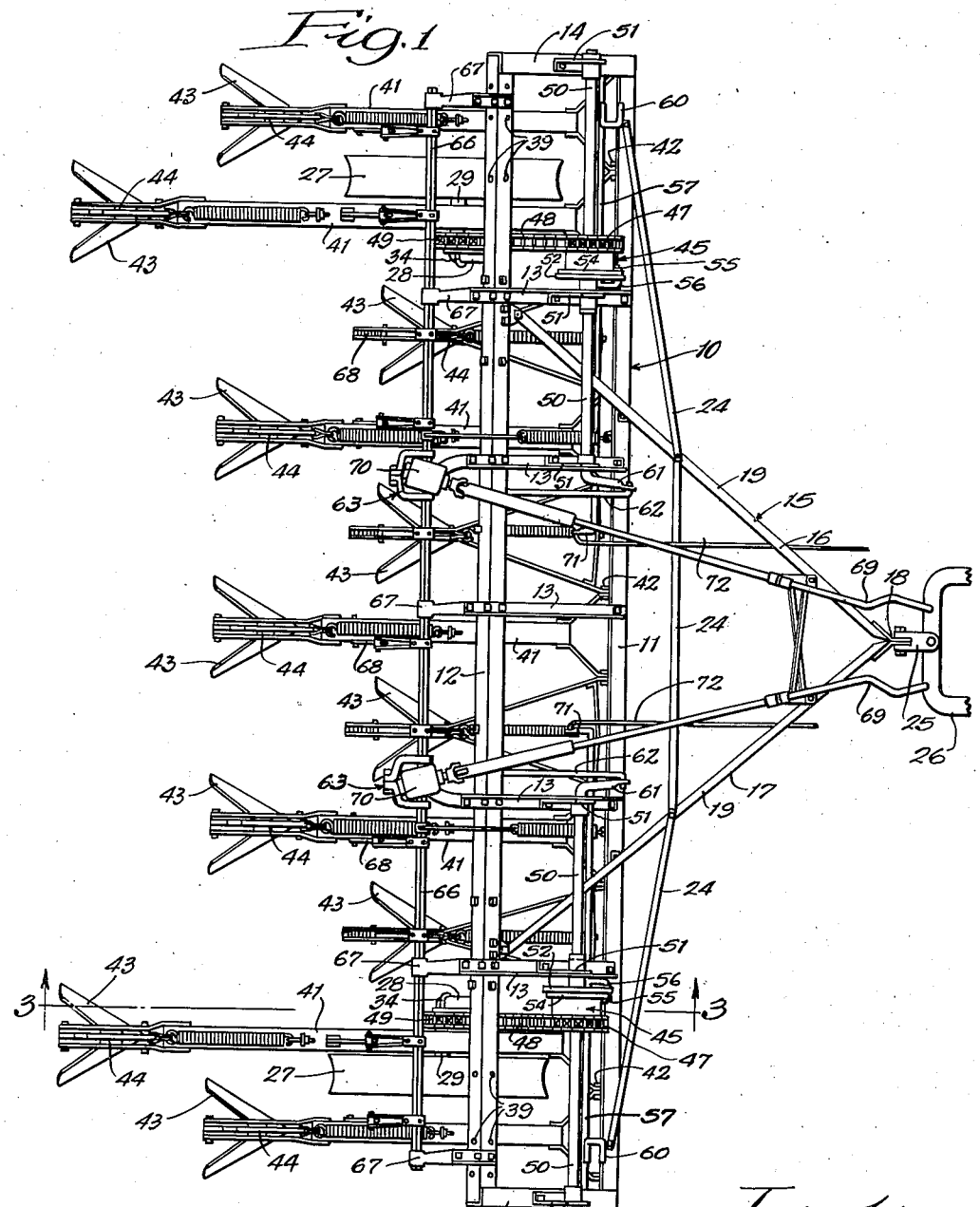

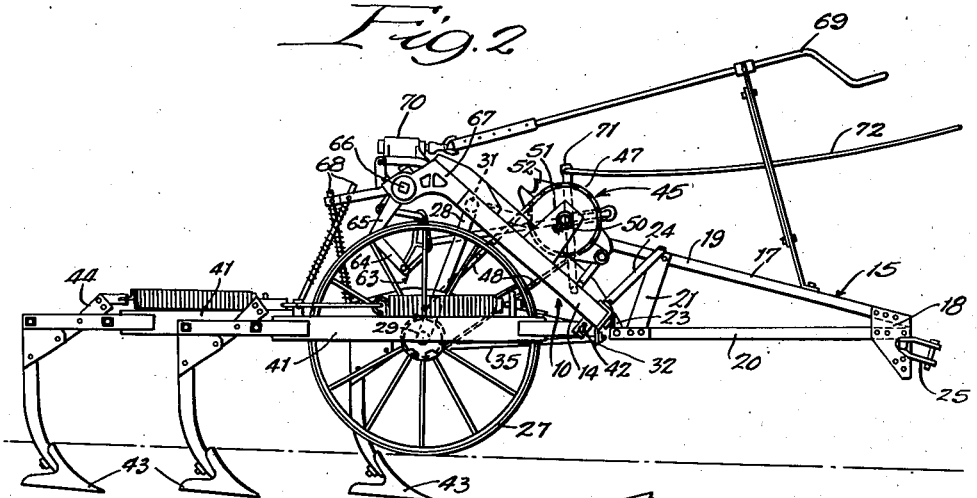
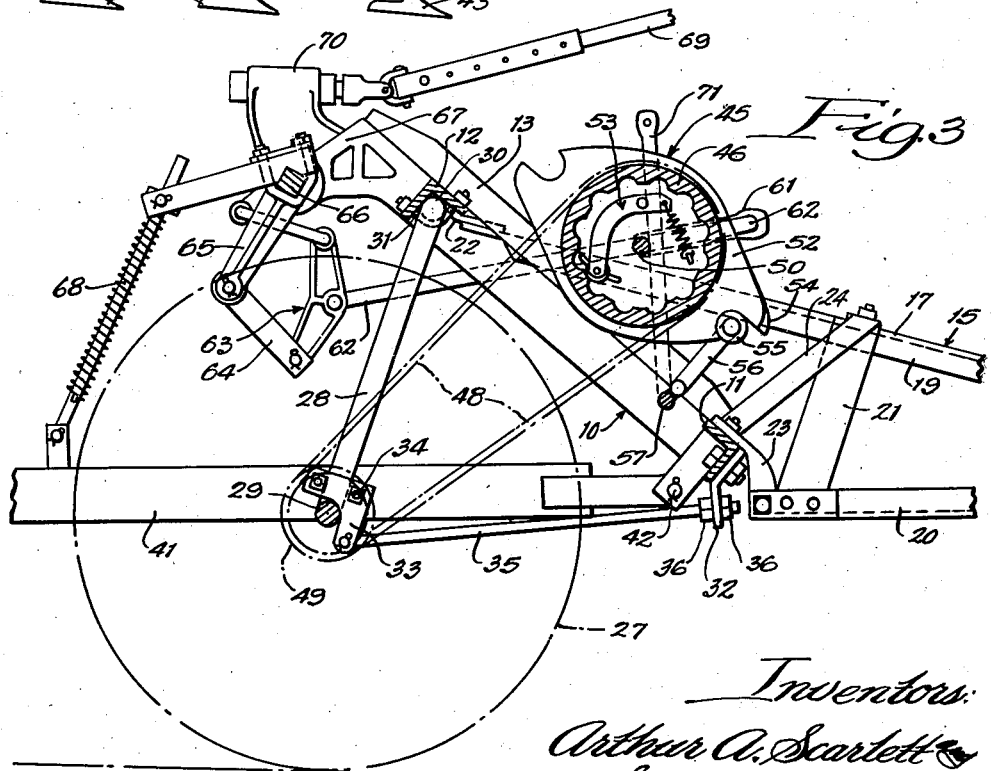

2,352,589

UNITED STATES PATENT OFFICE 2,352,589

AGRICULTURAL MACHINE

Arthur A. Scarlett and Stephen M. Young, Hamilton, Ontario, Canada, assignors, by mesne assignments, to International Harvester Company, Chicago, Ill., a corporation of New Jersey Application August 1, 1942, Serial No. 453,196

6 Claims. (Cl. 97—234)

This invention relates to an agricultural implement and more particularly to a field cultivator.

In agricultural machines in general and particularly in field cultivators, it is desirable at times to provide for different locations of the carrying means. In the ordinary field cultivator, there is provided a generally rectangular frame supported at opposite ends by carrying wheels, each of which is located slightly laterally inwardly of the respective outer end of the frame. In certain machines the wheels are located laterally outwardly of the ends of the frame. In both instances there are advantages centering about the locations of the wheels. However, there are occasions when it is desired to alter the locations of the wheels and this has heretofore been impossible.

The principal object of the present invention is to provide carrying wheels for an agricultural implement, said wheels being so mounted that they may be disposed in different locations.

An important object is to provide the foregoing structure in an agricultural implement of the field cultivator type.

Another object is to adapt for a field cultivator, having a power-lift means for raising and lowering the cultivator beams, an arrangement by which the power-lift means may be shifted according to the shifting of the locations of the wheels, whereby the lift means may be driven by the wheels while the wheels are in any one of their adjusted positions.

Another object is to provide for the supporting of the frame on the wheels by means of an improved supporting structure, said structure being further characterized by an ability to permit easy adjustment thereof for changing the positions of the wheels.

Another object is to provide operating means for the power lift, said means including lift-actuating members disposed in positions corresponding to the various positions the lift will assume according to the adjusted positions of the wheels.

The foregoing and other desirable objects and features of the invention will be completely disclosed in the following detailed description of a preferred embodiment of the invention as illustrated in the accompanying sheets of drawings, in which:

Figure 1 is a general plan view showing an agricultural implement of the field cultivator type embodying a preferred form of the invention;

Figure 2 is a side elevational view of the structure shown in Figure 1;

Figure 3 is an enlarged view with portions of the machine omitted showing the operating mechanism of the power-lift means taken along the line 3—3 of Figure 1;

Figure 4:
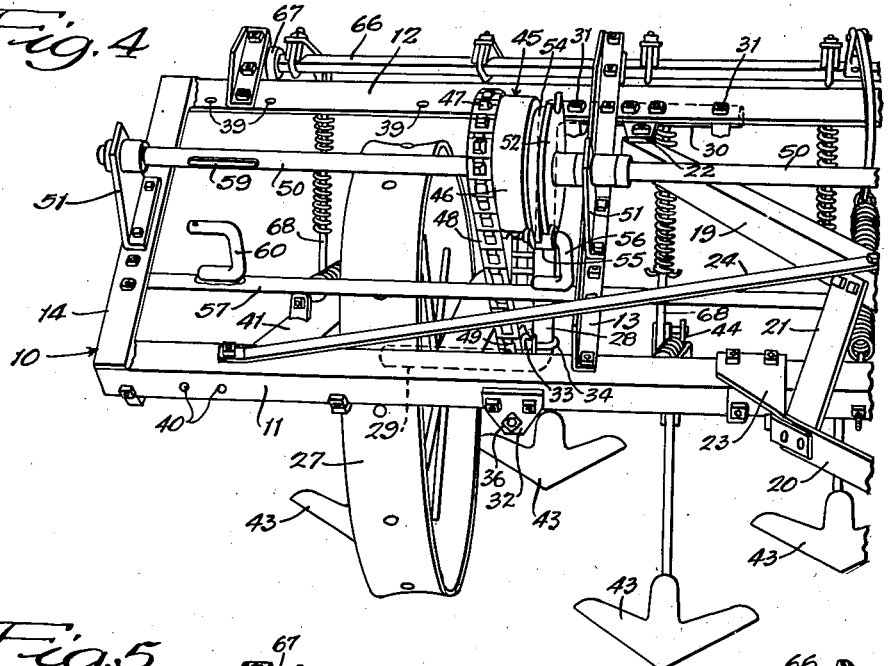
Figure 4 is a perspective view of one end of the machine showing the carrying wheel as located inwardly of the end of the frame.

Although the features of the invention may be utilized in any form of agricultural machine, the invention is best adapted for embodiment in a field cultivator, and accordingly the description and the drawings herein relate to that type of machine, it being understood, however, that the disclosure is representative and not limiting.

The cultivator shown includes a main frame, indicated generally by the numeral 10, comprising a pair of longitudinally spaced, transversely extending frame members, the front frame member being indicated at 11 and the rear member at 12. These members are preferably disposed in an inclined plane with the front member 11 disposed lower than the rear member 12. The members are connected by a plurality of transversely spaced, longitudinally extending members 13, the opposite end members being indicated at 14.

The frame includes a hitch structure, generally indicated at 15, comprising a pair of complementary frame halves 16 and 17 connected together at their forward ends, as at 18, and diverging rearwardly to points of connection with the frame 10. Each half of the hitch structure is in the form of a braced or trussed triangular structure including an upper member 19, a lower member 20, and a generally vertically extending bracing member 21. The apex of the triangle thus formed is at the apex of the larger triangle formed by the entire hitch. The upper members 19 extend rearwardly and are connected at 22 to the rear frame member 12 of the frame 10. The lower frame members 20 are connected by means of brackets 23 to the front frame member 11 of the frame 10. The entire hitch structure is further braced with respect to the frame 10 by a plurality of bracing rods or bars 24. The front end of the hitch structure 15 at the point 18 is provided with a clevis 25 which may be attached in the usual manner to a tractor draw-bar, indicated generally at 26.

The frame 10 is supported at opposite ends by a pair of carrying wheels 27. According to the present invention there has been provided an improved supporting structure for the connecting of the wheels 27 to the frame 10. This supporting structure is capable of being positioned on the frame 10 in either of two positions, one of which locates the wheels 27 respectively laterally inwardly of the end members 14 of the frame and the other of which locates the wheels respectively laterally outwardly of the end members. These positions of the wheels are shown respectively in Figures 4 and 5.

The supporting structures for the wheels 27 are identical and only one will be described, it being understood, however, that reference characters on one structure indicate corresponding parts of the other structure. A crank-axle 28 is provided with a lower wheel-journaling portion 29 and an upper frame-engaging portion 30. The wheel 27 is, of course, journaled on the portion 29 of the crank-axle. The upper end of the crank-axle is secured to the rear member 12 of the frame 10, the securing means preferably comprising a plurality of transversely spaced U-bolts 31. The lower end of the crank-axle is appropriately braced with respect to the frame 10 by a bracing structure comprising a bracket 32 on the front frame member 11 and a clamp means 33 engaging the crank-axle 28 adjacent the portion 29 thereof. This clamp is preferably held in place on the crank-axle by means of a U-bolt 34. A brace rod 35 is connected to the clamp means 33 and extends forwardly and is rigidly secured by lock nuts 36 to the bracket 32 on the front frame member 11.

When the wheels 27 are located in their inside positions, in which case they are disposed respectively under the ends of the frame 10, the supporting structures are adapted to be connected to the frame by means of portions especially provided therefor. Accordingly, the rear frame member 12 is provided with a plurality of openings 37 through which the U-bolts 31 are inserted. The front frame member is provided with a plurality of openings 38 through which may be inserted the bolts that secure the bracket 32 in place.

The frame members 11 and 12 are likewise arranged to accommodate the wheel-supporting structures when the wheels are located laterally outwardly of the ends of the frame 10. The frame member 12 is provided with a plurality of openings 39 through which the U-bolts on the upper portion of the crank 28 may be inserted, and the front frame member 11 is provided with a plurality of openings 40 for the accommodation of the bolts that secure the bracket 32 in place. It will thus be seen from the description thus far that the procedure required to be indulged in to alter the positions of the wheels 27 is exceedingly simple, requiring only the removing of the crank-axle 28 and bracket 32 from one position and reassembling those parts in their other positions.

The frame 10 is provided with a plurality of cultivator elements which may be of conventional construction. These elements comprise a plurality of rearwardly extending draw-bars or beams 41 pivotally connected at their forward ends, as at 42, to the front frame-bar 11 of the frame 10. The rear end of each beam is provided with a cultivator shovel 43, and each beam further includes trip mechanism 44 which may also be of conventional construction.

The cultivator elements are mounted for movement between raised and lowered positions, as is usual, and for this purpose the machine is provided with raising and lowering means in the form of a pair of power-lift mechanisms, indicated generally at 45. Since these mechanisms are identical, only one will be described, it being understood that corresponding reference characters as applied to one indicate corresponding parts in the other. Each power-lift mechanism may be of the conventional type known as the half-revolution type including a constantly rotating part 46 including a spocket 47 driven by a chain 48 from a sprocket 49 on the respective wheel 27. The lift mechanism is mounted on a transversely extending shaft 50 appropriately carried in brackets or bearings 51 transversely spaced across the frame 10. The member 46 is journaled on the shaft 50, and during normal operation of the cultivator the part 46 rotates without any effect on the cultivator elements.

The lift mechanism includes also the usual intermittently rotating part 52 which is keyed to the shaft 50 and which is adapted to be rotated with the part 46 by means of clutch mechanism indicated generally at 53. This mechanism is actuated for operation of the lift means by means of a clutch member 54 normally engaged by a roller 55 carried on an arm 56 secured to an operating rod 57. The rod 57 is journaled in suitable brackets on the frame 10 and extends transversely thereof, paralleling the shaft 50. The lift mechanism just described is generally conventional and only general reference has been had to the parts thereof, it being considered that those skilled in the art are familiar with the detailed structure of such mechanism.

Figure 5:
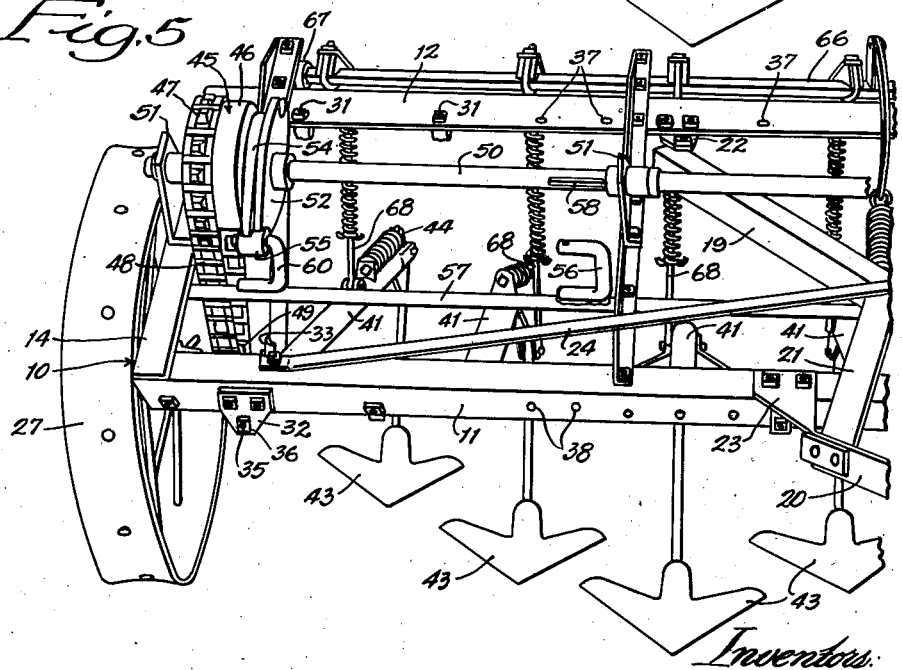
Figure 5 is a similar view showing the carrying wheel located laterally outwardly of the end of the frame.

The foregoing description of the lift mechanism has been made with reference to the location of the wheels 27 in their inward locations, as shown in Figure 4, and accordingly reference to the member that carries the roller 55 is had to the innermost member, as designated at 56 in Figures 1, 3, and 4.

Another of the features of the invention consists in the arrangement by which the power-lift mechanisms 45 are shiftable with respect to the frame 10, in accordance with the shifting of the location of the wheels 27. When the lift mechanisms are respectively in their inner positions, they are engaged respectively by driving keys 58 on the shaft 50. When the mechanisms are shifted to their outer positions, in accordance with the shifting of the wheels 27, the intermittently rotating parts 52 of the lifts are driven by driving keys 59 respectively carried by the shafts 50. When the wheels are shifted to their outermost positions, the power-lift mechanisms may also be shifted and the same driving means are respectively employed for the driving of the lift mechanisms by the wheels 27.

Another important feature of the invention is the provision of structure in the operating mechanism for the lift mechanism that permits the use of the same operating rod 57 for the actuating of the clutch mechanism 53 of the lift mechanism. To this end each operating rod 57 carries adjacent its outer end an upstanding arm 60 which is identical to the operating arm 56. When the wheel 27 and its corresponding lift mechanism 45 are disposed in the outside position, the clutch mechanism 53 is adapted to be operated by the arm 60, the roller 55 being then mounted on this arm.

The shafts 50 extend inwardly toward the center of the frame 10 and each has its inner end formed as a crank 61 which provides for the connection thereto of a rearwardly extending actuating member or pitman 62, the rearward end of which is connected to uniform-lift mechanisms indicated generally at 63. This mechanism is in turn connected by means of linkage 64 to an arm 65 secured on a transverse rock-shaft 66 journaled in suitable brackets 67 carried by the rear frame member 12. The rock-shaft 66 carries a plurality of transversely spaced arms 67', each of which is connected by lifting links 68 to one of the cultivator elements 41. The lifting linkage just described may be of any conventional construction and has not therefore been illustrated and described in greater detail.

The depth of the cultivator elements may be regulated by cranks 69 which have their forward ends located adjacent the tractor draw-bar 26 and which have their rearward ends associated with gearing (not shown) respectively contained in housings 70 supported on the frame 10.

The inner ends of the operating rods 57 are adjacent the center of the frame 10, and each is provided with an upstanding crank portion 71. These arms may be actuated by an operator on the seat of the tractor, to which the cultivator is connected, by means of a pair of pull ropes 72.

It will be seen from the foregoing description that there has been provided a field cultivator characterized by carrying wheels which may be located in any one of a plurality of positions for supporting the cultivator frame. Thus the advantages accruing to the particular location of the carrying wheels 27 may be obtained in the same machine. The supporting structures for the wheels 27 are such that the changing of the wheels from one position to another involves only the simple procedure consuming only a short period of time. The change-over may be made efficiently and rapidly. An important feature of the invention is the utilization of the same parts for the supporting of the wheels in different adjusted positions. As stated previously, another important feature of the invention is the adaptability of the power-lift mechanisms for positioning in accordance with the transversely adjusted positions of the wheels. It is also important to note that the lift mechanisms are not altered and that the same driving means, such as the sprockets 47 and 49 and chains 48, are used in any adjustment of the wheels. Still further, the additional operating arm 60 is of importance in adapting the power-lift mechanism for immediate operation in the positioning of said mechanism at the outer end of the frame 10; likewise the operating arm 56 may be utilized when the mechanisms 45 are moved to their inner positions.

Further objects and features of the invention will undoubtedly be apparent to those skilled in the art. It will be understood, of course, that the foregoing disclosure is of only a preferred embodiment of the invention and that numerous modifications and alterations may be made therein without departing from the spirit and scope of the invention as defined in the appended claims.

What is claimed is:

1. For a cultivator having a generally rectangular frame including transverse front and rear members and longitudinal end members, and cultivator elements carried by the frame for movement between raised and lowered positions: a pair of transversely spaced wheels for carrying the frame; a pair of supporting means respectively between the wheels and frame, each means including a crank-axle having a wheel-journaling portion and a frame-engaging portion; means for mounting the supporting means on the frame for transverse adjustment of said supporting means and wheels between positions laterally inside the respective end members of the frame to positions laterally outside said end members, each mounting means including means adjustably connecting the frame-engaging portion of a crank-axle to the frame, and a brace member connected between said crank-axle and the front transverse member of the frame for transverse adjustment as the supporting means is adjusted transversely; a pair of raising and lowering means on the frame associated with the cultivator elements; drive means respectively between said raising and lowering means and the wheels; and means respectively mounting said drive means for adjustment and operation according to the transverse adjustment of said wheels.

2. For an agricultural machine having a generally rectangular frame including transverse members and longitudinal end members, and ground-engaging elements carried by the frame: a pair of transversely spaced wheels for carrying the frame; a pair of supporting means respectively between the wheels and frame, each means including a crank-axle having a wheel-journaling portion and a frame-engaging portion; means for mounting the supporting means on the frame for transverse adjustment of said supporting means to adjust the wheels between positions laterally inside the respective end members of the frame to positions laterally outside said end members, each mounting means including means adjustably connecting the frame-engaging portion of a crank-axle to the frame, and a brace member connected between said crank-axle and a transverse member of the frame for transverse adjustment as the supporting means is adjusted transversely; operable means on the frame associated with the ground-engaging elements; drive means between said operable means and at least one of the wheels; and means mounting said drive means for adjustment and operation according to the transverse adjustment of said wheels.

3. For an agricultural machine including a frame having generally transverse members and a longitudinal end member, and ground-working elements carried by the frame for movement between raised and lowered positions: a ground wheel; supporting means between the wheel and frame, comprising a crank-axle having a pair of oppositely extending portions, one of which journals the wheel and the other of which is adapted for mounting on the frame; means mounting the second named portion of the crank-axle on the frame for adjusting of said supporting means and the wheel transversely, from one position with the wheel laterally inside the end member of the frame to another position with the wheel laterally outside said end member; means for raising and lowering the ground-working elements, including a transverse operating shaft carried by the frame; means mounting the raising and lowering means for adjustment transversely of the shaft according to the position of the wheel; and means for driving the raising and lowering means from the wheel in either of its positions.

4. For an agricultural machine including a frame having generally transverse members and a longitudinal end member, and ground-working elements carried by the frame for movement between raised and lowered positions: a ground wheel; supporting means between the wheel and frame; means mounting the supporting means on the frame for adjusting of said supporting means and the wheel transversely, from one position with the wheel laterally inside the end member of the frame to another position with the wheel laterally outside said end member; a transverse shaft rotatably carried by the frame; raising and lowering means for the ground-working elements mounted on the shaft for adjustment transversely of the shaft in accordance with the transverse adjustment of the wheel; means for driving the raising and lowering means from the wheel in either position of the wheel and raising and lowering means; an operating rod paralleling the shaft, including a pair of actuating members spaced transversely and engageable respectively with the raising and lowering means in the adjusted positions of the latter.

5. For an agricultural machine having a frame including a transverse lower front portion, a higher rear portion, and opposite longitudinal end members, and ground-engaging elements connected to the frame: a pair of transversely spaced wheels; a pair of supporting means respectively between the wheels and the frame, each means including a crank-axle having a wheel-journaling portion and a frame-engaging portion; means for mounting the supporting means on the frame for transverse adjustment of said supporting means and wheels between positions laterally inside the respective end members of the frame to positions laterally outside said end members, each mounting means including means adjustably connecting the frame-engaging portion of a crank-axle to the higher, rear portion of the frame, and a brace member connected between said crank-axle and the lower front portion of the frame for transverse adjustment as the supporting means is adjusted transversely; a pair of operable means on the frame associated with the ground-engaging elements; drive means respectively between said operable means and the wheels; and means respectively mounting said drive means for adjustment and operation according to the transverse adjustment of said wheels.

6. For a cultivator having a frame including a lower front portion, a higher rear portion, and opposite longitudinal end members, and cultivator elements connected to the frame for movement between raised and lowered positions: a pair of transversely spaced wheels; a pair of supporting means respectively between the wheels and the frame, each means including a crank-axle having a lower wheel-journaling portion and a higher frame-engaging portion; means for mounting the supporting means on the frame for transverse adjustment of said supporting means and wheels between positions laterally inside the respective end members of the frame to positions laterally outside said end members, each mounting means including means adjustably connecting the frame-engaging portion of a crank-axle to the higher, rear portion of the frame, and a brace member connected between a lower portion of said crank-axle and the lower front portion of the frame for transverse adjustment as the supporting means is adjusted transversely; a pair of raising and lowering means on the frame associated with the cultivator elements; drive means respectively between said raising and lowering means and the wheels; and means respectively mounting said drive means for adjustment and operation according to the transverse adjustment of said wheels.

ARTHUR A. SCARLETT.
STEPHEN M. YOUNG.